(12) United States Patent
Lin et al.

(10) Patent No.: US 11,313,486 B2
(45) Date of Patent: Apr. 26, 2022

(54) ELECTROMAGNETIC REGULATING VALVE WITH CHECK FUNCTION

(71) Applicant: Zhejiang Sci-Tech University, Hangzhou (CN)

(72) Inventors: Zhe Lin, Hangzhou (CN); Zeyong Wu, Hangzhou (CN); Desheng Chen, Hangzhou (CN); Guang Zhang, Hangzhou (CN); Zuchao Zhu, Hangzhou (CN)

(73) Assignee: Zhejiang Sci-Tech University, Hangzhou (CN)

( * ) Notice: Subject to any disclaimer, the term of this patent is extended or adjusted under 35 U.S.C. 154(b) by 0 days.

(21) Appl. No.: 17/142,080

(22) Filed: Jan. 5, 2021

(65) Prior Publication Data
US 2022/0049788 A1    Feb. 17, 2022

(30) Foreign Application Priority Data
Aug. 13, 2020 (CN) .......................... 202010812353.7

(51) Int. Cl.
*F16K 31/06* (2006.01)
*F16K 15/06* (2006.01)
*F16K 15/18* (2006.01)

(52) U.S. Cl.
CPC ........ *F16K 31/0644* (2013.01); *F16K 15/063* (2013.01); *F16K 15/18* (2013.01); *F16K 31/0682* (2013.01)

(58) Field of Classification Search
CPC ............. F16K 31/0644; F16K 31/0682; F16K 31/0651; F16K 31/0648; F16K 15/063; F16K 15/066; F16K 15/12; F16K 15/10; F16K 15/08; F16K 15/18; F16K 15/184; F16K 31/061; F16K 31/0617; F16K 31/0668
USPC ............ 137/512.15, 512.5, 540; 251/129.15, 251/129.21, 129.22
See application file for complete search history.

(56) References Cited

U.S. PATENT DOCUMENTS

| | | | | |
|---|---|---|---|---|
| 642,808 | A * | 2/1900 | Stumpf | F16K 15/10 137/516.13 |
| 946,684 | A * | 1/1910 | Neighbors | F16K 15/00 137/315.33 |
| 8,944,098 | B1 * | 2/2015 | Bocos | F16K 15/026 137/512.1 |
| 9,466,695 | B2 * | 10/2016 | Taraud | F16K 31/04 |

\* cited by examiner

*Primary Examiner* — Craig J Price
*Assistant Examiner* — Andrew J Rost
(74) *Attorney, Agent, or Firm* — Alliance IP, LLC (57) ABSTRACT

The present disclosure discloses an electromagnetic regulating valve with a check function. The valve may effectively regulate the flow in a valve body. Due to different lengths and taper angles of a valve flap group, the flow can be regulated more finely, and a medium can be prevented from backflow by a check function when necessary. Meanwhile, a mesh structure of bases of valve flaps can effectively reduce the instability of flow field motion so as to achieve an effect of rectifying.

8 Claims, 7 Drawing Sheets

ELECTROMAGNETIC REGULATING VALVE WITH CHECK FUNCTION

CROSS-REFERENCE TO RELATED APPLICATION

This Application claims the benefit of priority to Chinese Patent Application Serial No. CN 202010812353.7, which was filed on Aug. 13, 2020. The disclosure of the prior application is considered part of and hereby incorporated by reference in its entirety in the disclosure of this application.

TECHNICAL FIELD

The present disclosure belongs to an electromagnetic regulating valve in the technical field of fluid control valves, and particularly relates to an electromagnetic regulating valve with a check function.

BACKGROUND

A regulating valve, also known as control valve, is mainly used in process industry to change the process parameters, such as flow and pressure, with the help of power operation. During the use of the regulating valve, in the case of a small opening degree, the regulation precision is limited and more precise regulation cannot be realized due to a single valve flap when a common regulating valve regulates the flow. Meanwhile, the common control valve can only regulate the parameters, such as the flow and the pressure, in the valve body simply, so adverse consequences may be caused when a backflow phenomenon occurs in the valve body. Therefore, a novel electromagnetic regulating valve with a check function is invented according to the needs of the existing actual use.

SUMMARY

In order to solve the problems in the background, the present disclosure provides an electromagnetic regulating valve with a check function, which can regulate the flow, prevent a medium from backflow, and achieve a rectifying effect through a simple circuit.

The technical solution adopted by the present disclosure to solve the technical problems is as follows:

The electromagnetic regulating valve with the check function comprises a left end valve body, valve flaps, an electromagnetic coil, an iron core, an annular permanent magnet, an annular spring, a right end valve body, a sealing ring, an orifice plate, and a valve flap group base. The left end valve body is connected to the right end valve body by bolts and nuts. The flow channels of the left end valve body and the right end valve body are coaxially communicated with each other. An annular cavity is formed in the side wall of one end, close to the right end valve body, of the left end valve body. The iron core wound with the electromagnetic coil is placed in the cavity. The cross section of the flow channel at one end, close to the right end valve body, of the left end valve body is machined and arranged into an orifice plate. An annular groove which is communicated with the flow channel is formed outside the inner side wall of one end, close to one end of the left end valve body, of the right end valve body. The annular permanent magnet and the annular spring are placed in the annular groove in sequence in the direction from the position close to the left end valve body to the position far away from the left end valve body. The annular spring is connected between the groove wall of one side, far away from the left end valve body, of the annular groove and the annular permanent magnet. The circular valve flap group base is fixedly mounted in the central hole of the annular permanent magnet. The valve flaps are mounted on one end surface, close to the left end valve body, of the valve flap group base.

The valve flap group base is mainly formed by connecting a number of circular bases through a support frame. Various circular bases are arranged into multiple circles. The diameter dimensions of the circular bases of various circles are gradually decreased in the radial direction from outside to inside. The diameter dimensions of various circular bases of each circle are the same. The circular bases of the outermost circle are fixedly connected to the wall of the central hole of the annular permanent magnet through the support frame. A valve flap is arranged on each circular base. All valve flaps form a valve flap group. Each valve flap comprises a lug boss and a choke cylinder. One end of each choke cylinder is mounted in the corresponding circular base. The other end of each choke cylinder is connected with the corresponding lug boss after penetrating out from the orifice plate. The axial lengths of the valve flaps on the circular bases of various circles are shortened gradually in the radial direction from the outside to the inside.

The lengths of the choke cylinders on the circular bases of various circles are gradually increased from the center to the periphery. The heights of the lug bosses on the circular bases of various circles are gradually increased from the center to the periphery. The lug bosses are truncated cone-shaped; the inclination angles of the conical surfaces of the end parts of the lug bosses on the circular bases of various circles are gradually decreased from the center to the periphery.

The position distribution of various circular bases on the valve flaps are consistent with the position distribution of various orifices of the orifice plate.

A through hole is formed in the outer side surface of the cavity of the left end valve body; the through hole is used for leading out and connecting an output wire of the electromagnetic coil to an external control circuit.

A right end flange of the left end valve body and a left end flange of the right end valve body are mounted opposite to each other in a matched manner, and are connected with each other by the bolts and the nuts. The end surface flanges of the left end valve body and the right end valve body are connected with each other through a sealing ring in a sealing manner.

The beneficial effects of the present disclosure are that:

The electromagnetic regulating valve with the check function prevents the medium from backflow by controlling the positions of the permanent magnet and the valve flap group through an external control circuit, and matching the orifice plate, the spring, and the valve flap group. Compared with the conventional single valve flap, the flow can be regulated and controlled more precisely in a regulating process by adopting the valve flap group structure at present, so precise regulation and quick check are realized. The electromagnetic regulating valve with the check function can be widely applied to the fields of chemical industry, light industry, water conservancy, petroleum, and etc.

The drawings include the following components: 1-left end valve body; 2-valve flap; 3-electromagnetic coil; 4-iron core; 5-bolt; 6-nut; 7-annular permanent magnet; 8-annular spring; 9-right end valve body; 10-sealing ring; 11-through hole; 12-orifice plate; 21-lug boss; 22-choke cylinder; 23-support frame; 24-valve flap group base.

DETAILED DESCRIPTION

The present disclosure will be further described with reference to the accompanying drawings and embodiments.

Figure 1:
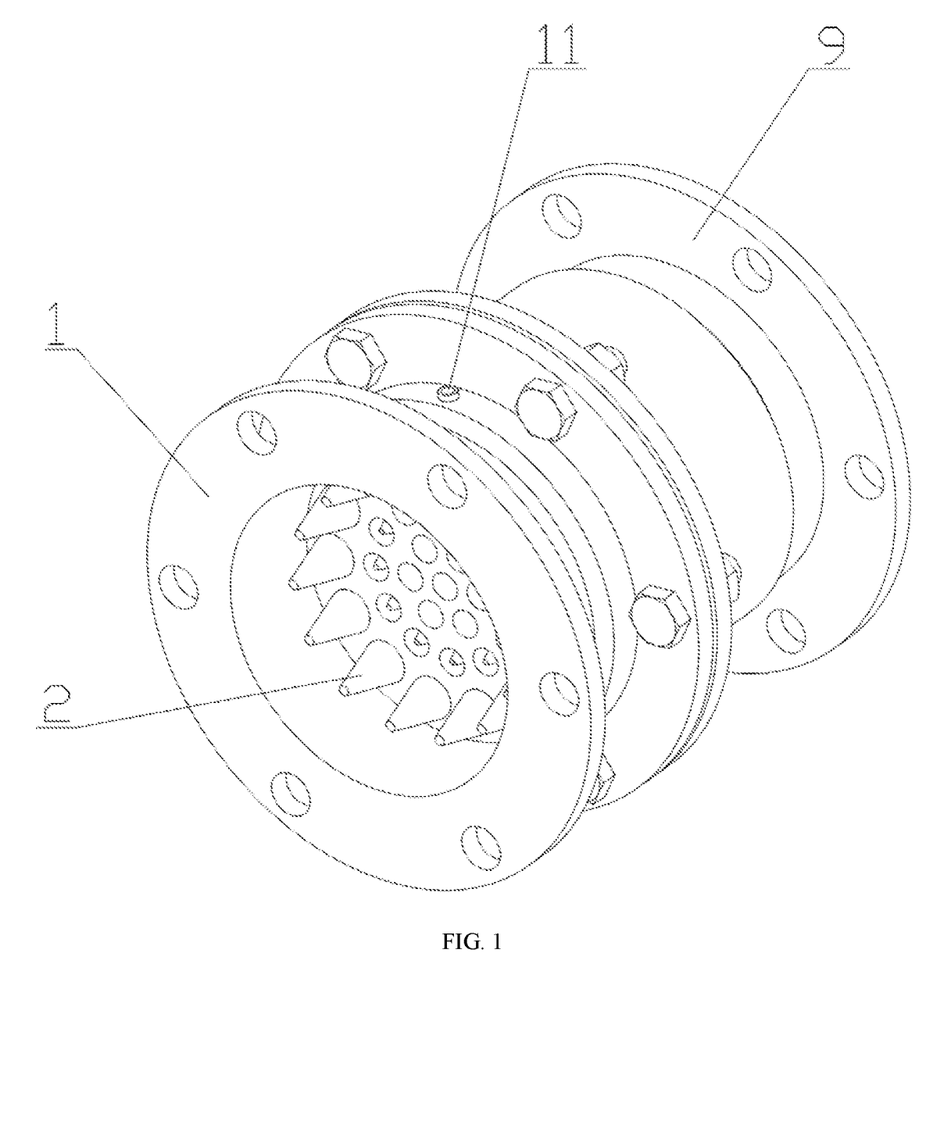
FIG. 1 is a stereogram of an electromagnetic regulating valve with a check function in accordance with at least one embodiment.
Figure 2:
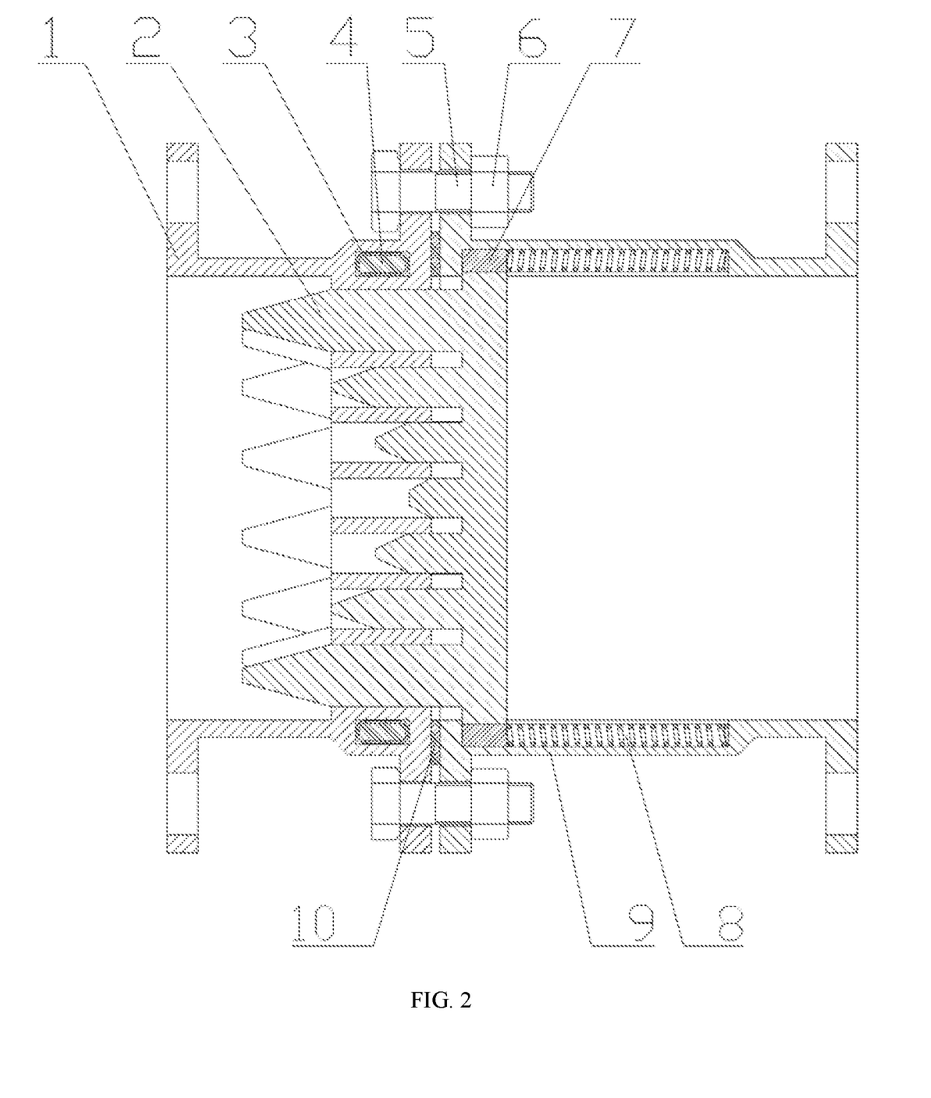
FIG. 2 is a section view of the electromagnetic regulating valve with the check function in the closed state in accordance with at least one embodiment.
Figure 3:
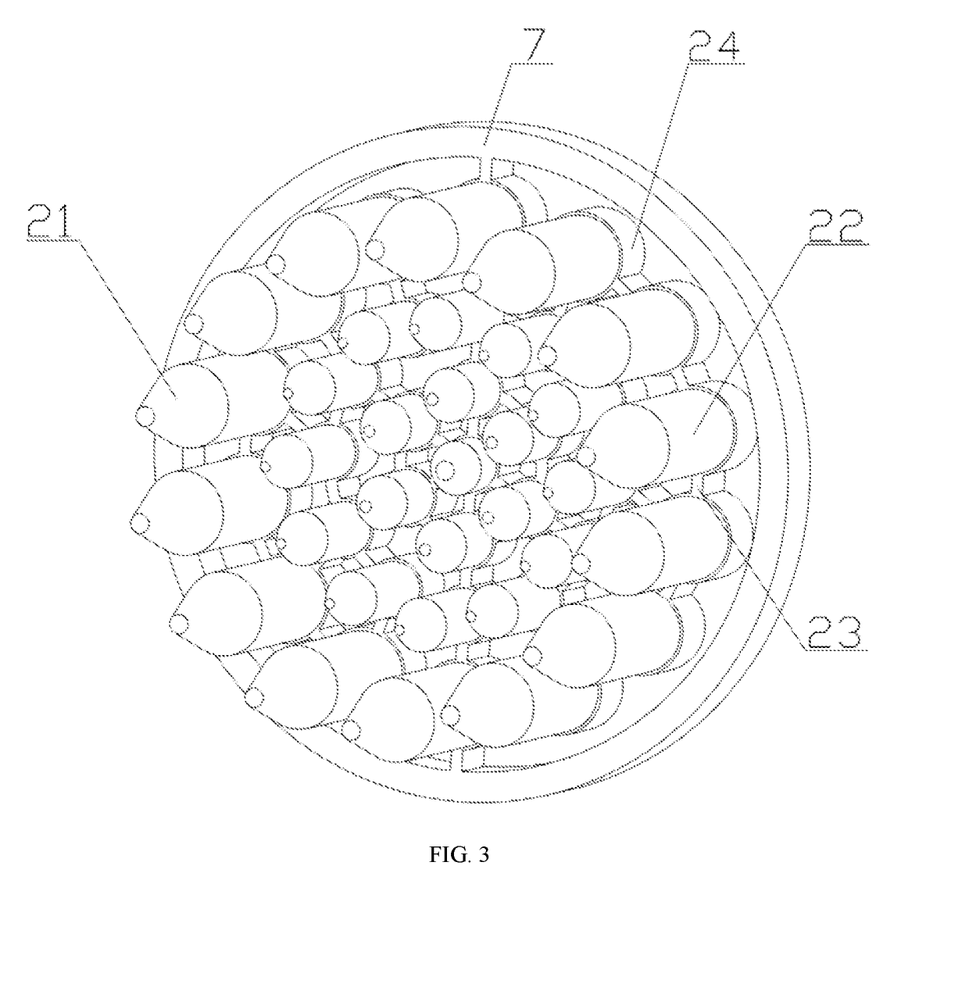
FIG. 3 is a schematic diagram of the appearance of the valve flap group of the electromagnetic regulating valve with the check function in accordance with at least one embodiment.

As shown in FIG. 1 and FIG. 2, an electromagnetic regulating valve with a check function comprises a left end valve body 1, valve flaps 2, an electromagnetic coil 3, an iron core 4, an annular permanent magnet 7, an annular spring 8, a right end valve body 9, a sealing ring 10, an orifice plate 12, and a valve flap base 24 (shown in FIG. 3). A right end flange of the left end valve body 1 and a left end flange of the right end valve body 9 are mounted opposite to each other in a matched manner, and are connected to form a main valve body by bolts 5 and nuts 6. The flow channels of the left end valve body 1 and the right end valve body 9 are coaxially communicated with each other. The end surface flanges of the left end valve body 1 and the right end valve body 9 are connected with each other through a sealing ring 10 in a sealing manner. In one embodiment, the sealing ring is made of fluororubber. An inner hole of a flange connecting piece on one side of the valve body serves as a water inlet. An inner hole of a flange connecting piece on the other side of the valve body serves as a water outlet. The flow direction of a fluid in an embodiment is from the left end valve body 1 to the right end valve body 9.

An annular cavity is formed in the side wall of one end, close to the right end valve body 9, of the left end valve body 1. The iron core 4 wound with the electromagnetic coil 3 is placed in the cavity. The cross section of the flow channel, close to one end of the right end valve body 9, of the left end valve body 1 is machined and arranged into an orifice plate 12. An annular groove which is communicated with the flow channel is formed outside the inner side wall of one end, close to the left end valve body 1, of the right end valve body 9. The annular permanent magnet 7 and the annular spring 8 are placed in the annular groove in sequence in the direction from the position close to the left end valve body 1 to the position far away from the left end valve body 1, that is, the annular permanent magnet 7 is arranged in one side, close to the left end valve body 1, of the annular groove; the annular spring 8 is arranged in one side, far away from the left end valve body 1, of the annular groove; the annular spring 8 is connected between the groove wall of one side, far away from the left end valve body 1, of the annular groove and the annular permanent magnet 7, and is placed on one side, deviating from the electromagnetic coil, of the annular permanent magnet. The circular valve flap group base 24 is fixedly mounted in the central hole of the annular permanent magnet 7. The valve flaps 2 are mounted on one end surface, close to the left end valve body 1, of the circular valve flap group base 24.

A power control device is located in the cavity outside the orifice plate of the left end valve body 1, and is used for controlling the horizontal movement of the annular permanent magnet 7 that is nested in the right end valve body 9. The electromagnetic regulating valve with the check function further comprises a check regulator mounted inside the valve body. The check regulator comprises an orifice plate structure that is nested in the left end valve body 1, a valve flap group that is matched with the orifice plate structure inside the left end valve body 1, the iron core 4 that is fixed to the interior of the cavity of the left end valve body 1 and is wound with the electromagnetic coil 3, the annular permanent magnet 7 that is nested in the annular groove of the right end valve body 9, and the annular spring 8 that is placed in a track, back to the electromagnetic coil 3, of the annular permanent magnet 7, wherein the valve flap group is formed by combining the valve flaps 2 which consist of choke cylinders 22 with different lengths and lug bosses 21 with different taper angles. The valve flap group is mounted in the valve flap group base 24 at the bottom of the valve flap group. The diameter of the valve flap group base 24 is greater than that of the valve flaps 2. The valve flap group base 24 is connected with the support frame 23 to form a mesh structure. The top and the bottom of the overall mesh structure are connected to the annular permanent magnet 7 in the track.

The annular spring 8 is used for controlling the movement of the overall valve flap group. The annular spring 8 is placed on the other side different from the side where the electromagnetic coil 3 is located, so that the valve flaps 2 are in a closed state under normal conditions, which is beneficial to improving the sealing performance of the overall structure.

Figure 4:
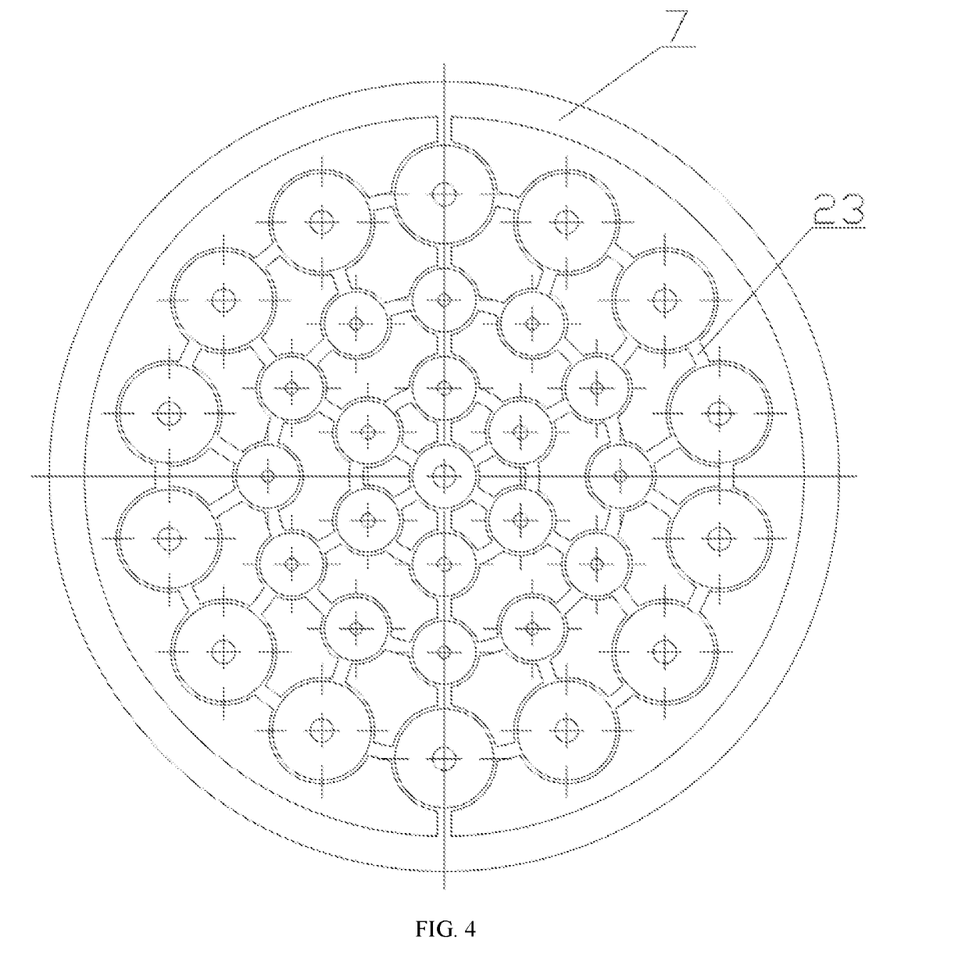
FIG. 4 is a right view of the valve flap group of the electromagnetic regulating valve with the check function in accordance with at least one embodiment.
Figure 5:
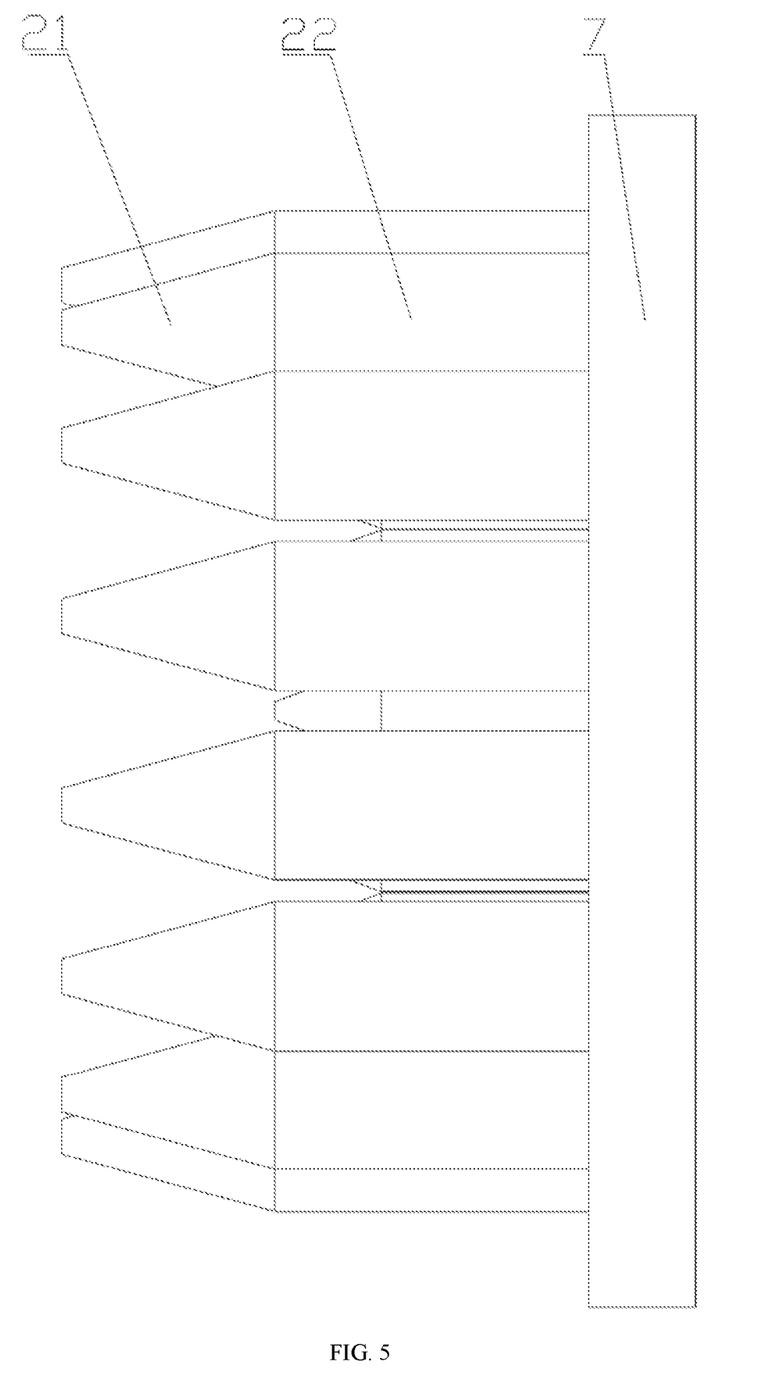
FIG. 5 is a main view of the valve flap group of the electromagnetic regulating valve with the check function in accordance with at least one embodiment.

As shown in FIG. 3, FIG. 4 and FIG. 5, the valve flap group base 24 is mainly formed by connecting a number of circular bases through the support frame 23. Various circular bases are arranged into multiple circles. The diameter dimensions of the circular bases of various circles are gradually decreased in the radial direction from outside to inside. The diameter dimensions of various circular bases of each circle are the same. A regular multi-circle mesh structure is formed. Circumferentially adjacent/radially adjacent pairwise circular bases are connected with each other through the support frame 23. The circular bases of the outermost circle are fixedly connected to the wall of the central hole of the annular permanent magnet 7 through the support frame 23. A valve flap 2 is arranged on each circular base. All valve flaps 2 form the valve flap group. Each valve flap 2 comprises a lug boss 21 at the top end and a choke cylinder 22 in the middle. One end of each choke cylinder 22 is mounted in the corresponding circular base. The choke cylinders 22 are arranged on one side close to the left end valve body 1. The other end of the choke cylinder 22 are connected with the truncated cone-shaped lug bosses 21 after penetrating out from the orifices of the orifice plate 12. The axial lengths of the valve flaps 2 on the circular bases of various circles are shortened gradually in the radial direction from the outside to the inside. The positions of the valve flap group base 24 and the valve flap group thereon relative to the orifice plate 12 are regulated by matching the annular permanent magnet 7 with the electromagnetic coil 3 in the cavity of the left end valve body 1, so the flow regulation and check functions of the valve are realized.

The lengths of the choke cylinders 22 on the circular bases of various circles are gradually increased from the center to the periphery. The heights of the lug bosses 21 on the circular bases of various circles are gradually increased from the center to the periphery.

The lug bosses 21 are truncated cone-shaped lug bosses 21. The inclination angles of the conical surfaces of the end parts of the lug bosses 21 on the circular bases of various circles are gradually decreased from the center to the periphery.

The position distribution of various circular bases behind the valve flaps 2 are consistent with the position distribution of various orifices of the orifice plate 12. The orifice plate 12 is placed corresponding to right end valve flaps 2. The diameters of the orifices in the orifice plate 12 are the same as the outside diameters of the choke cylinders 22 and the lug bosses 21.

Figure 6:
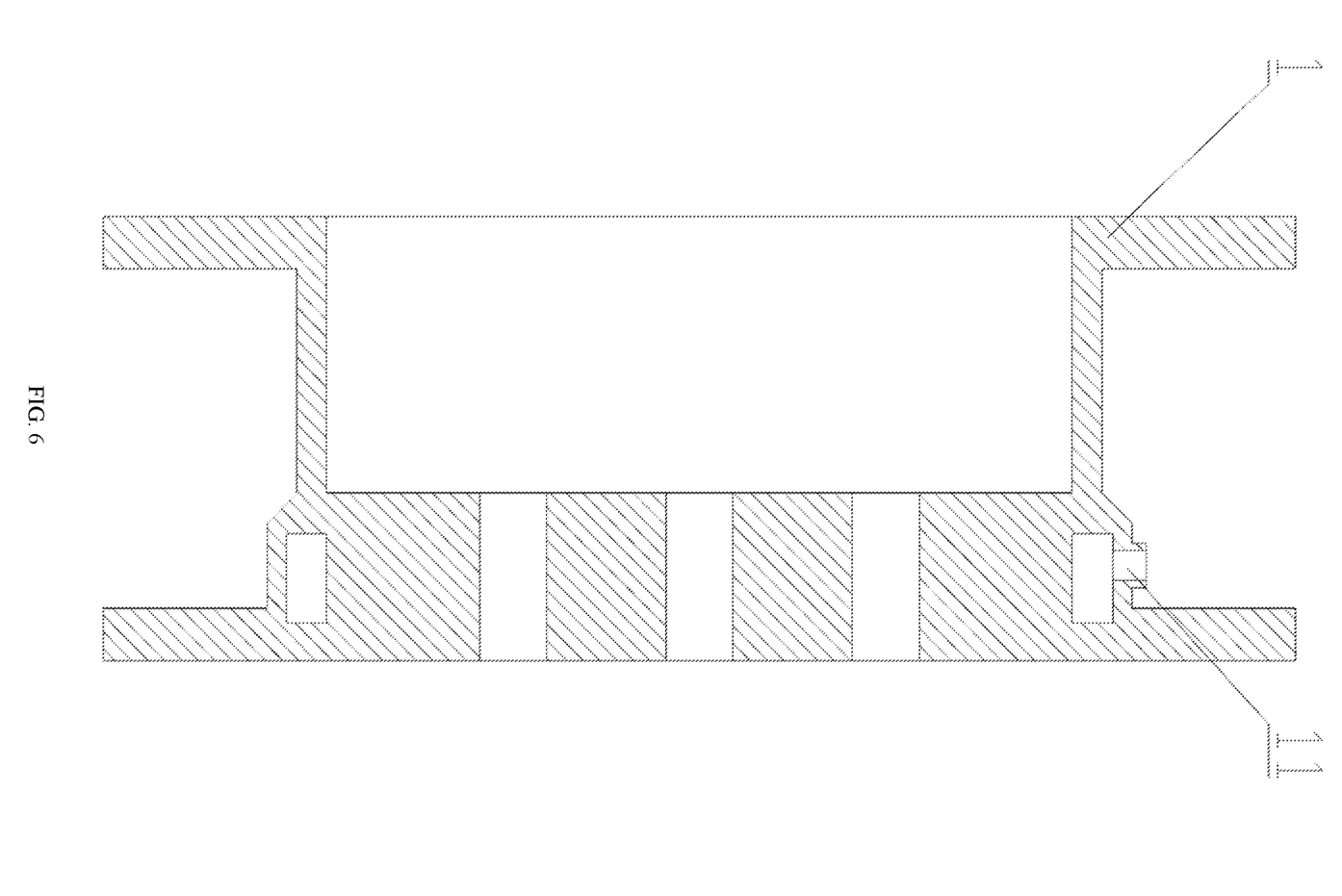
FIG. 6 is a section view of a left end valve body of the electromagnetic regulating valve with the check function in accordance with at least one embodiment.

As shown in FIG. 6, a through hole 11 is formed in the outer side surface of the cavity in the left end valve body 1. The through hole 11 is used for leading out and connecting an output wire of the electromagnetic coil 3 to an external control circuit.

A right end flange of the left end valve body 1 and a left end flange of the right end valve body 9 are mounted opposite to each other in a matched manner, and are connected with each other by the bolts 5 and the nuts 6.

The end flanges of the left end valve body 1 and the right end valve body 9 are connected with each other through a sealing ring 10 in a sealing manner. In one embodiment, the sealing ring is made of fluororubber.

A working principle is that: the present disclosure aims to control the opening and closing and the check function of a valve by controlling whether to energize an energizing electromagnetic coil 3 and change the magnetic field intensity of an iron core 4 by controlling the energizing current intensity in the electromagnetic coil 3 in a manner of combining an electromagnetic action, the design of a valve structure, and the action of the annular spring 8, so as to control the distance between the permanent magnet 7 at the right end and the orifice plate 12 at the left end and between the valve flaps 2 and the orifice plate 12 at the left end, thereby controlling the flow. Due to a large number of the valve flaps 2, precise control of the flow can be realized, and the chaos of the fluid in the valve can be reduced by a mesh structure at the tail, thereby achieving a rectifying effect. The electromagnetic regulating valve with the check function is simple in structure and convenient to maintain.

A regulating method adopting the electromagnetic regulating valve with the check function of the present disclosure includes the following process that:

In an initial normal state, the valve is in a closed state, and the valve flaps 2 of the most central circle are in close fit with the orifice plate 12 of the most central circle. The annular permanent magnet 7 is in close fit with the side wall surface, close to the electromagnetic coil 3, of the cavity.

Figure 7:
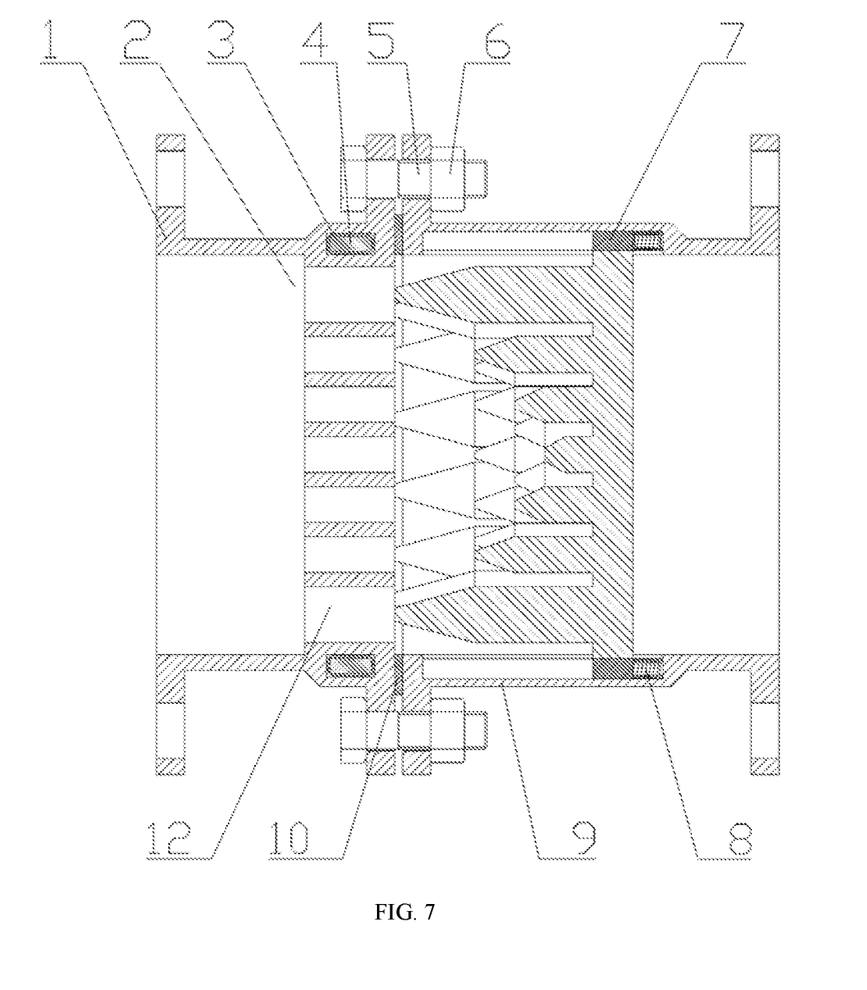
FIG. 7 is a section view of the electromagnetic regulating valve with the check function in the open state in accordance with at least one embodiment.

Opening and regulating functions are as follows: the electromagnetic coil 3 in the cavity of the left end valve body 1 is energized, so a magnetic field is generated in the electromagnetic coil 3, and the annular permanent magnet 7 in the right end valve body 9 is subjected to the action of the repulsive force of the magnetic field generated by the electromagnetic coil 3, so that the annular permanent magnet 7 drives the overall valve flap group to move towards a fluid forward direction away from the electromagnetic coil 3; the valve flaps located on the circular bases of the center circle on the valve flap group are separated from various orifices in the center circle of the orifice plate 12, so a regulatable gap is formed between the valve flap group and the orifice plate 12.

The axial positions of the valve flaps 2 are changed by changing the current intensity of the energized coil 3, so the fluid enters from the inlet of the valve body and flows to the outlet through the gap between the valve flap group and the orifice plate 12; the valve flaps 2 on different radial circumferences of the circular bases are regulated to separate from various orifices on the corresponding radial circumferences in the orifice plate 12, and the gaps at the positions of different circles are changed, so the opening degree is regulated, the opening and the opening degree of the valve are regulated.

A check function is as follows: the electromagnetic coil 3 is de-energized, the annular permanent magnet 7 loses the magnetic field repulsive force exerted by electromagnetic coil 3 in the cavity of left end valve body 1, and axially moves in the direction close to the orifice plate 12 under the action of the annular spring 8 until the annular permanent magnet 7 moves to fit the groove wall of one side, close to the left end valve body 1, of the annular groove, that is, until the annular permanent magnet 7 moves to the leftmost end of the annular groove as shown in FIG. 2, so the cylindrical surfaces of the valve flaps of the most center circle fit and seal the orifices of the most central circle of the orifice plate 12 to prevent the fluid from circulating.

The electromagnetic coil 3 is energized, by an external circuit, to generate the magnetic field to control the annular permanent magnet 7 at the right end to move left and right. The opening degree of the valve is controlled by regulating the position of the annular permanent magnet 7 in the track. The annular spring 8 in the track achieves an effect of precisely controlling the position of the annular permanent magnet 7.

As shown in FIG. 7, when current is applied to the electromagnetic coil 3, the electromagnetic coil 3 generates an electromagnetic field with magnetic field intensity, and generates a repulsive force on the annular permanent magnet 7 of the right end valve body 9, so that the annular permanent magnet 7 moves in the direction of the right end valve body and drives the valve flap group base 24 which is connected to the annular permanent magnet 7 to also move in the direction of the right end valve body. When the current is increased constantly, the annular permanent magnet 7 moves in the direction of the right end valve body to compress the annular spring 8 constantly; when the annular spring 8 is compressed until it cannot be compressed, at this time, the position of the valve flap group base 24 is the maximum distance that the valve flap group base 24 can reach, and the valve body is at the maximum opening degree.

As shown in FIG. 2, when the current is not applied to the electromagnetic coil 3, the annular permanent magnet 7 of the right end valve body 9 and the valve flap group base 24 move leftwards due to the acting force of the annular spring 8 and water flow, and finally, the annular permanent magnet 7 fits the left end wall surface of the annular groove, at this time, the top end of the choke cylinder 22 of the valve flap in the center of the valve flaps 2 fits the circular orifice in the center of the orifice plate 12; the choke cylinders 22 of the rest valve flaps also fit the circular orifices in the corresponding positions of the orifice plate 12, so that the flow and direction control and the sealing control of the valve are realized.

In a specific implementation, both the magnetic pole direction of the annular permanent magnet 7 and the current direction of the electromagnetic coil 3 can be regulated accordingly.

In one embodiment, the length changes of various valve flaps 2 are further defined to gradually increase from the center to the periphery. The heights of the lug bosses 21 at the front ends of various valve flaps are gradually increased from the center to the periphery. The inclination angles of the lug bosses 21 at the front ends of various valve flaps 2 are gradually decreased from the center to the periphery. The diameters of the orifice plate 12 and the valve flaps are gradually increased from the center to the periphery.

It can be seen that the technical effects of the present disclosure are remarkable. Precise control of the flow in the valve can be realized, and the medium in the valve can be prevented from backflow. Meanwhile, a very good sealing effect can be achieved, the instability of the fluid in the valve is reduced, and a rectifying effect is achieved. The electromagnetic regulating valve with the check function is simple in structure and convenient to maintain.

What is claimed is:

1. An electromagnetic regulating valve with a check function, the electromagnetic regulating valve comprising a left end valve body, valve flaps, an electromagnetic coil, an iron core, an annular permanent magnet, an annular spring, a right end valve body, a sealing ring, an orifice plate, and a valve flap group base; wherein:
   the left end valve body is connected to the right end valve body by bolts and nuts;
   flow channels of the left end valve body and the right end valve body are coaxially communicated with each other;
   an annular cavity is formed in a side wall of one end of the left end valve body that is closest to the right end valve body;
   the iron core is wound with the electromagnetic coil and placed in the annular cavity;
   a cross section of a flow channel at one end of the left end valve body that is closest to the right end valve body is machined and arranged into the orifice plate;
   an annular groove is formed in an inner side wall of one end of the right end valve body that is closest to the left end valve body;
   the annular permanent magnet and the annular spring are placed in the annular groove in sequence in a direction from a position closest to the left end valve body to a position further from the left end valve body;
   the annular spring is connected between the annular permanent magnet and a groove wall of one side of the annular groove that is furthest away from the left end valve body;
   the valve flap group base is fixedly mounted in a central hole of the annular permanent magnet; and
   the valve flaps are mounted on one end surface of the valve flap group base that is closest to the left end valve body.

2. The electromagnetic regulating valve with the check function according to claim 1, wherein:
   the valve flap group base is formed by connecting a plurality of circular bases through a support frame;
   various circular bases are arranged into multiple circles;
   diameter dimensions of the circular bases of various circles are gradually decreased in a radial direction from outside to inside;
   diameter dimensions of various circular bases of each circle are equal;
   circular bases of the outermost circle are fixedly connected to a wall of the central hole of the annular permanent magnet through the support frame;
   the valve flaps are arranged on the circular bases, respectively;
   all valve flaps form a valve flap group;
   each valve flap comprises a lug boss and a choke cylinder;
   an end of each choke cylinder is mounted in a corresponding circular base and an other end of each choke cylinder is connected with a corresponding lug boss;
   axial lengths of the valve flaps on the circular bases of various circles are shortened gradually in the radial direction from outside to inside.

3. The electromagnetic regulating valve with the check function according to claim 2, wherein lengths of the choke cylinders on the circular bases of various circles are gradually increased from a center to a periphery; heights of the lug bosses on the circular bases of various circles are gradually increased from the center to the periphery.

4. The electromagnetic regulating valve with the check function according to claim 2, wherein the lug bosses are truncated cone-shaped; and inclination angles of conical surfaces of end parts of the lug bosses on the circular bases of various circles are gradually decreased from the center to a periphery.

5. The electromagnetic regulating valve with the check function according to claim 2, wherein position distribution of various circular bases behind the valve flaps are consistent with position distribution of various orifices of the orifice plate.

6. The electromagnetic regulating valve with the check function according to the claim 1, wherein a through hole is formed in an outer side surface of the cavity of the left end valve body; and the through hole is adapted to lead out and connect an output wire of the electromagnetic coil to an external control circuit.

7. The electromagnetic regulating valve with the check function according to claim 1, wherein a right end flange of the left end valve body and a left end flange of the right end valve body are mounted opposite to each other in a matched manner, and are connected with each other by the bolts and the nuts.

8. The electromagnetic regulating valve with the check function according to claim 1, wherein end surface flanges of the left end valve body and the right end valve body are connected with each other through a sealing ring in a sealing manner.

* * * * *